(12) United States Patent
Clements et al.

(10) Patent No.: US 6,357,771 B1
(45) Date of Patent: Mar. 19, 2002

(54) TORSION BAR WITH VARIABLE RATE ANCHOR ARM FOR A VEHICLE SUSPENSION SYSTEM

(75) Inventors: Mark Clements, Lapeer; Joe Fader, Brighton; Chris Keeney; Steve Yollick, both of Troy, all of MI (US); Jim Hawkins, Madison, AL (US)

(73) Assignee: Meritor Light Vehicle Systems, Inc., Troy, MI (US)

( * ) Notice: Subject to any disclaimer, the term of this patent is extended or adjusted under 35 U.S.C. 154(b) by 0 days.

(21) Appl. No.: 09/578,647

(22) Filed: May 25, 2000

(51) Int. Cl.$^7$ ................................................. B60G 3/99
(52) U.S. Cl. .................... 280/124.13; 280/124.137; 280/124.167; 280/124.149
(58) Field of Search ...................... 280/124.13, 124.137, 280/124.167, 124.149, 5.511, 93.51, 124.106; 267/273, 276, 277, 278, 279

(56) References Cited

U.S. PATENT DOCUMENTS

| | | | | |
|---|---|---|---|---|
| 2,080,546 A | * | 5/1937 | Rudoni | 267/278 |
| 2,536,769 A | * | 1/1951 | Rix et al. | 280/124.106 |
| 2,624,568 A | * | 1/1953 | Kany | 267/278 |
| 2,792,235 A | * | 5/1957 | Federspiel | 280/5.507 |
| 2,998,263 A | * | 8/1961 | Muller et al. | 280/124.106 |
| 3,448,995 A | * | 6/1969 | Stallard et al. | 280/124.106 |
| 4,243,247 A | * | 1/1981 | Kataoka | 280/6.157 |
| 4,470,616 A | | 9/1984 | Kaneko et al. | |
| 4,641,856 A | * | 2/1987 | Reichenback | 280/5.511 |
| 4,863,148 A | | 9/1989 | Hufnagel | |
| 5,178,406 A | | 1/1993 | Reynolds | |
| 5,378,010 A | * | 1/1995 | Marino et al. | 280/124.107 |
| 5,685,527 A | * | 11/1997 | Harbali et al. | 267/277 |
| 5,687,960 A | | 11/1997 | Moon | |
| 5,921,569 A | | 7/1999 | Noutomi et al. | |

* cited by examiner

Primary Examiner—J. J. Swann
Assistant Examiner—David R. Dunn
(74) Attorney, Agent, or Firm—Carlson, Gaskey & Olds

(57) ABSTRACT

A suspension system includes a torsion bar attached to a vehicle frame member by an adjuster assembly including a spring biasing anchor arm. The biasing member provides an elastic resistance to torsion bar rotation for suspension system vibrations below a predetermined torsional force. However, when the predetermined torsional force is exceeded, the elastic resistance of the biasing member is overcome and the anchor arm rotates into contact with the stop. Further suspension system vibrations are absorbable by the torsion bar with stiffer resistance to provide a stiffer suspension response. The stiffer suspension is thus provided when required, such as when cornering, while allowing a smooth ride when not required, such as during normal straight travelling.

15 Claims, 1 Drawing Sheet

TORSION BAR WITH VARIABLE RATE ANCHOR ARM FOR A VEHICLE SUSPENSION SYSTEM

BACKGROUND OF THE INVENTION

The present invention relates to a torsion bar assembly for a vehicle suspension system, and more particularly to an anchor arm adjuster assembly that provides a dual spring rate to the torsion bar.

Vehicles are commonly equipped with independent suspension systems which can include a vibration or shock absorbing device for absorbing road shock and other vibrations while providing a smooth and comfortable ride for the vehicle occupants. One type of shock absorbing system includes a torsion bar. In suspension systems of this type, the torsion bar extends longitudinally along the length of the vehicle. One end of the torsion bar is connected to a suspension control arm while the other end is connected to the vehicle frame. The torsion bar twists with articulation of the suspension component to provide a torsional elastic resistance to the up/down or jounce/rebound movement of the suspension component. The torsion bar thereby acts as a spring to absorb vibrations from the road surface and provide particular handling qualities.

As noted, one end of the torsion bar is attached to the vehicle frame. It is known to provide an anchor arm to connect the end of the torsion bar to the frame. The anchor arm rigidly attaches the torsion bar to the vehicle frame. The anchor arm also allows the torsion bar to be preloaded or twisted to provide a particular initial spring rate to the torsion bar and thereby tune the suspension characteristics. However, such conventional torsion bar anchor arm systems, once preloaded, are limited to the predefined constant spring rate of the torsion bar.

Accordingly, it is desirable to provide a torsion bar suspension, which can provide dual spring rates.

SUMMARY OF THE INVENTION

The suspension system according to the present invention generally includes an adjuster assembly to provide a spring biased mount between a torsion bar and a vehicle frame. The torsion bar is rotationally mounted through a vehicle frame cross member and attached thereto by the adjuster assembly. Preferably, the adjuster assembly interacts with a stop to limit rotation of the torsion bar. Further, the stop provides a fixed support for a biasing member to act against the anchor arm. Rotation of the anchor arm toward the stop compresses the biasing member and provides an elastic resistance to rotational movement of the torsion bar.

The biasing member provides an elastic resistance to torsion bar rotation for suspension system vibrations below a predetermined torsional force. However, when the predetermined torsional force is exceeded, the elastic resistance of the biasing member is overcome and the anchor arm rotates into contact with the stop. Further suspension system vibrations are absorbable by the torsion bar to provide a stiffer suspension response. The stiffer suspension is thus provided when required, such as when cornering, while allowing a smooth ride when not required, such as during normal straight travelling.

The present invention therefore provides a torsion bar mounting assembly for a vehicle suspension system which can enhance riding comfort and handling by dualized the response of the suspension system.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
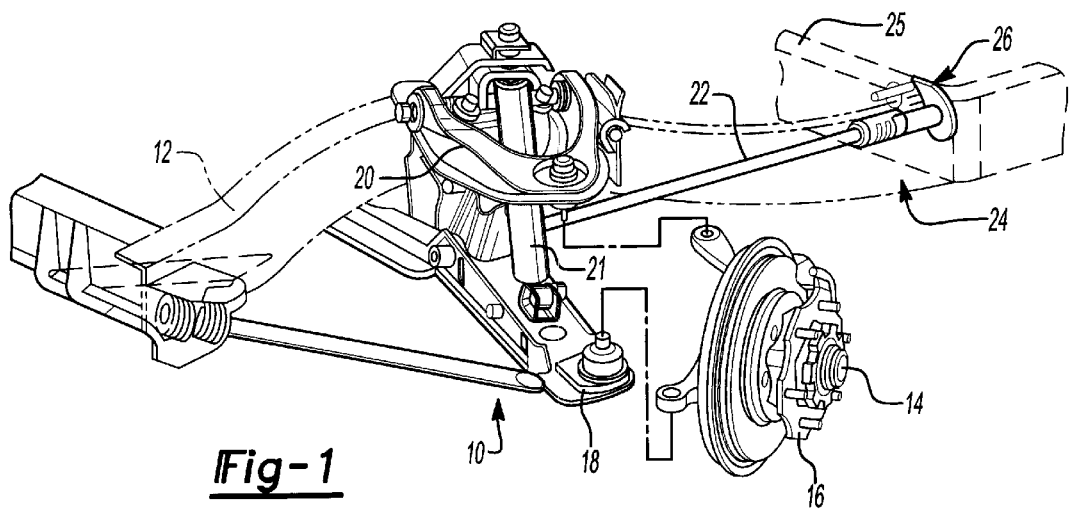
FIG. 1 is a general phantom view of a vehicle suspension system according to the present invention.

FIG. 1 schematically illustrates a suspension system 10 for a vehicle 12. The system 10 generally includes an axle 14 that supports a hub 16. The axle 14 is articulatable in an up/down direction via a lower suspension link 18 and an upper suspension link 20.

A torsion bar 22 is connected to the lower link 18 at one end. An adjuster assembly 26 mounts the other end of the torsion bar 22 to a cross member 25 of the vehicle frame 24. To dampen the movement of the lower suspension link 18, a shock absorber 21 is typically connected between the lower link 18 and the vehicle frame 24. In operation, the torsion bar 22 twists in response to the articulation of the lower link 18 due to the up/down movement of the axle 14. In this way, the torsion bar 22 provides elastic resistance to the up/down articulation of the lower link 18.

Figure 2:
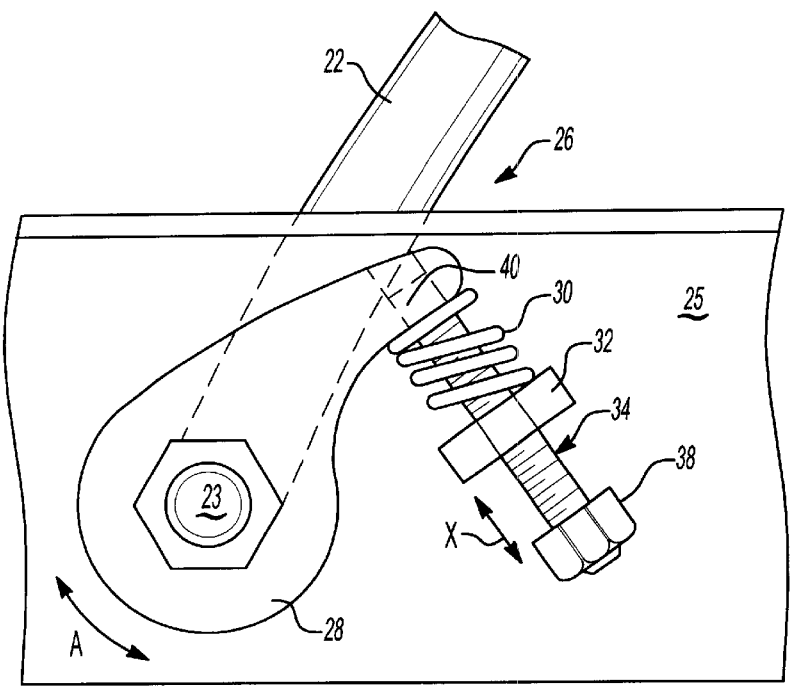
FIG. 2 is an expanded view facing forwardly along a torsion bar according to the present invention.

Referring to FIG. 2, one end of the torsion bar 22 passes through the cross member 25 and is attached to the adjuster assembly 26. The adjuster assembly 26 generally includes an anchor arm 28, a biasing member 30 a stop 32, and a fastener 34. Fastener 34 is fixed to anchor anm 28. Stop 32 is fixed to member 25, and fastener 34 moves through stop 32.

The torsion bar 22 is preferably rotationally mounted through the cross member 25 and fixed to the anchor arm 28. The connection is preferably at an end 23 of torsion bar 22. The anchor arm 28 extends radially from the torsion bar 22 and is rotatable in the direction defined by arrow A. Rotation of the torsion bar 22 is limited by the stop 32. The stop 32 is fixed to the cross member 25 and preferably allows axial movement of the fastener 34 along arrow X.

The biasing member 30 is supported along its length by the fastener 34 such that the biasing member 30 is trapped between the stop 32 and the anchor arm 28. Rotation of the anchor arm 28 slides the fastener 34 through stop 32 and compresses biasing member 30. The biasing member 30 provides an elastic resistance against rotation of anchor arm 28 through angle A.

In response to articulation of the suspension link 18 (FIG. 1), the torsion bar 22 is rotatable through angle A until the anchor arm 28 contacts stop 32. Angle "A" can therefore be defined by arm 28 contacting the stop 32 at one end (full compression of the biasing member 30) and a head 38 of fastener 34 contacting stop 32 at the other (full extension of the biasing member 30). Of course, dependant on the spring force, further rotation of arm 28 may be limited prior to arm 28 actually contacting stop 32. Preferably, the fastener 34 is threadably engageable into corresponding threads 40 into the anchor arm 28. By threading the fastener 34 into or out the anchor arm 28, the elastic resistance or free length of the biasing member 30 may be accordingly stiffened or relaxed.

In a normal position (i.e., when no substantial force is placed on bar 22) the spring 30 will maintain the arm 28 at some rotated position. Potentially, adjusting the fastener 34 as mentioned above can control this position.

Figure 3:
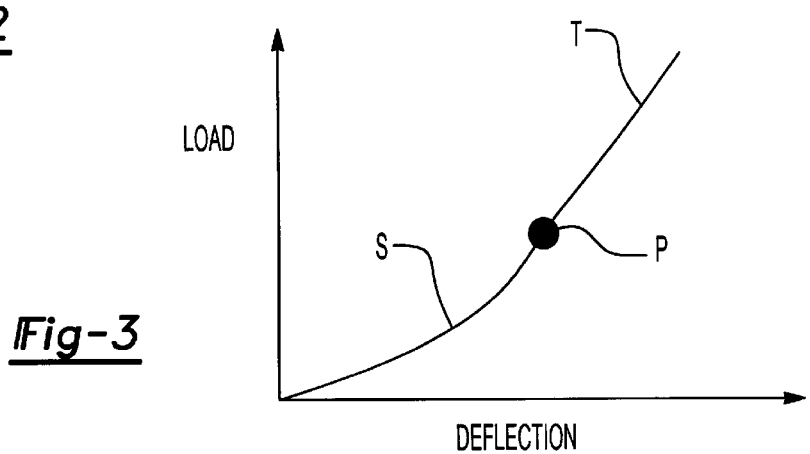
FIG. 3 is a graphical representation of the response characteristics of a torsion bar system according to the present invention.

FIG. 3 illustrates the dual response of the suspension system 10 according to the present invention. Segment S defines the response of the adjuster assembly 26 prior to further rotation of anchor arm 28 being prevented by stop 34. Segment T defines the response of the torsion bar 22 after stop 34 limits further movement of arm 28. As graphically illustrated in FIG. 3, relatively small impacts, such as that which occur during a normal straight travelling condition, are absorbable by the rotation of the anchor arm 28 against the biasing member 30. The stiffness of the biasing member 30 in combination with the torsional resistance of the torsion bar 22 therefore defines the response illustrated by segment S.

Point P defines the shift from segment S to segment T. Point P illustrates the predetermined torsional force at which the adjuster arm 28 will be prevented from rotating further by biasing member 30 and stop 34. As graphically illustrated in FIG. 3, when a force above the predetermined force P is encountered, such as that which occurs during a hard turn, the anchor arm 28 is prevented from further rotation. Torsional resistance is then provided by the torsion bar 22 in a known manner.

It should be understood that FIG. 3 shows a load in one direction and the corresponding response. A similar graph could be made below the deflection axis of FIG. 3. The point P may differ depending on the design of the overall assembly. That is, rotation in one direction from the "free" position would be in response to a load above the deflection line of FIG. 3, and rotation in the opposed direction would be defined below the deflection line.

Because the biasing member absorbs impacts below the predetermined torsional force, the suspension system according to the present invention provides a smooth ride. However, when the predetermined torsional force is exceeded, the adjuster arm contacts the stop and the suspension system is stiffened. The stiffer suspension is thus provided when it is required, such as when cornering, while allowing a smooth ride when it is not required, such as during normal straight travelling.

While the particular disclosed arrangement uses a coil spring, other biasing members, including air springs, etc. could be substituted. The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A vehicle and suspension system comprising:
    a suspension member;
    a torsion bar having a first segment attached to said suspension member;
    an anchor arm fixed to a second segment of said torsion bar, said anchor arm rotatably mounted relative to a vehicle frame member; and
    an adjuster assembly mounted to said vehicle frame member, said adjuster assembly including a member at least partially surrounded by a biasing member, said biasing member mounted between said anchor arm and a stop extending from said vehicle frame member, said adjuster assembly operable to provide an elastic resistance to said rotational movement of said anchor arm when said torsion bar is subjected to less than a predetermined torsional force and further rotation of said adjuster arm prevented by contact between said anchor arm and said stop above said predetermined torsional force.

2. The vehicle and suspension system as recited in claim 1, wherein an adjustable fastener is threadably receivable into said anchor arm to set said predetermine torsional force.

3. The vehicle and suspension system as recited in claim 2, wherein an adjustable fastener is threadably receivable into said anchor arm to preset a free length of said biasing member.

4. The vehicle and suspension system as recited in claim 1, wherein said stop is a portion of the vehicle frame which provides a reaction surface for said biasing member.

5. The vehicle and suspension system as recited in claim 1, wherein said member slidably extends through said stop.

6. The vehicle and suspension system as recited in claim 1, wherein said member is an adjustable fastener.

7. The vehicle and suspension system as recited in claim 1, wherein said member extends through a hole in said stop and is biased in a direction such that a piece of such member hits said stop, stopping further movement.

8. The vehicle and suspension system as recited in claim 1, wherein said member includes a threaded segment.

9. The vehicle and suspension system of claim 8, wherein a bolt head on said fastener selectively contacts said stop.

10. A vehicle and suspension system comprising:
    a suspension member;
    a torsion bar having a first segment attached adjacent said suspension member;
    an anchor arm fixed to a second segment of said torsion bar, said anchor arm rotatably mounted relative to a vehicle frame member; and
    an adjuster assembly mounted to said vehicle frame member, said adjuster assembly including an adjustable fastener at least partially surrounded by a biasing member, said adjustable fastener threadably receivable into said anchor arm, said biasing member applying a force to said adjuster arm at a point spaced from an attachment point of said second segment to said torsion bar, said torsion bar defining a rotational axis for rotational movement of said anchor arm relative to said vehicle frame, rotation of said adjuster arm being resisted by an elastic resistance from said biasing member when said torsion bar is subjected to less than a predetermined torsional force, and further rotation of said adjuster arm being prevented by contact between said anchor arm and a stop such that said biasing member no longer provides an elastic resistance when said torsion bar is subjected to a torsional force that exceeds said predetermined torsional force.

11. The vehicle and suspension system as recited in claim 10, wherein said biasing member includes a mechanical spring.

12. The vehicle and suspension system as recited in claim 10, wherein said adjuster assembly includes said biasing member trapped between said anchor arm and a stop attached to said vehicle frame.

13. The vehicle and suspension system as recited in claim 12, wherein said adjustable fastener is movable through said stop in response to rotation of said anchor arm.

14. The suspension system as recited in claim 10, wherein said stop extends from said vehicle frame member to provide a reaction surface for said biasing member.

15. The vehicle and suspension system as recited in claim 10, wherein said adjustable fastener slidably extends through said stop.

* * * * *